(12) United States Patent
Dooley et al.

(10) Patent No.: US 10,501,191 B1
(45) Date of Patent: Dec. 10, 2019

(54) INTEGRATED AIRCRAFT COOLING MACHINE

(71) Applicants: Matthew M. Dooley, Torrance, CA (US); Clarence W. Lui, Diamond Bar, CA (US)

(72) Inventors: Matthew M. Dooley, Torrance, CA (US); Clarence W. Lui, Diamond Bar, CA (US)

(73) Assignee: NORTHROP GRUMMAN SYSTEMS CORPORATION, Falls Church, VA (US)

(*) Notice: Subject to any disclaimer, the term of this patent is extended or adjusted under 35 U.S.C. 154(b) by 137 days.

(21) Appl. No.: 15/873,723

(22) Filed: Jan. 17, 2018

(51) Int. Cl.
*B64D 13/08* (2006.01)
*B64D 13/06* (2006.01)

(52) U.S. Cl.
CPC ...... *B64D 13/08* (2013.01); *B64D 2013/0618* (2013.01); *B64D 2013/0644* (2013.01); *B64D 2013/0648* (2013.01)

(58) Field of Classification Search
CPC .................. B64D 13/08; B64D 13/06; B64D 2013/0618; B64D 2013/0644; B64D 2013/0648
See application file for complete search history.

(56) References Cited

U.S. PATENT DOCUMENTS

| | | | | |
|---|---|---|---|---|
| 5,442,905 A | * | 8/1995 | Claeys | B64D 13/06 454/71 |
| 6,250,097 B1 | * | 6/2001 | Lui | B64D 13/06 62/402 |
| 6,663,044 B1 | | 12/2003 | Squier et al. | |
| 6,848,261 B2 | | 2/2005 | Claeys | |
| 2007/0266695 A1 | * | 11/2007 | Lui | B64D 13/06 60/204 |

* cited by examiner

*Primary Examiner* — Emmanuel E Duke
(74) *Attorney, Agent, or Firm* — Tarolli, Sundheim, Covell & Tummino LLP

(57) ABSTRACT

An aircraft cooling machine is provided that includes a closed loop air cycle system and a vapor cycle system that both provide cooling aircraft loads. The closed loop air cycle system includes a compressor and a turbine and the vapor cycle system includes a compressor, condenser and an evaporator. A coupler is provided that pneumatically couples the turbine in the closed loop air cycle system to the compressor in the vapor cycle system via existing pneumatic power in the closed loop air cycle system.

20 Claims, 8 Drawing Sheets

INTEGRATED AIRCRAFT COOLING MACHINE

TECHNICAL FIELD

This disclosure relates generally to air cycle systems and vapor cycle systems for aviation vehicles.

BACKGROUND

Rising costs in air vehicle operating costs have forced the aircraft industry to investigate more energy efficient designs relating to propulsion, electronic component cooling systems (e.g., air cycle systems), air conditioning systems (e.g., vapor cycle systems), etc. With the more recent push towards more electric aircraft, an entirely new trade space has been opened up with regards to thermal management and the cost of bleed air versus electrical power. Even though the electric power generation system has favorable energy savings, the electric power generation and distribution system increases the burden on the aircraft propulsion engine shaft power extraction systems (e.g., gearbox and drive train), electrical generators, power conditioning units, and electrical distribution systems.

SUMMARY

The following presents a simplified summary in order to provide a basic understanding of the subject disclosure. This summary is not an extensive overview of the subject disclosure. It is not intended to identify key/critical elements or to delineate the scope of the subject disclosure. Its sole purpose is to present some concepts of the subject disclosure in a simplified form as a prelude to the more detailed description that is presented later.

One example of the subject disclosure includes an aircraft cooling assembly that includes a closed loop air cycle system that provides cooling to aircraft loads where the air cycle system includes a first compressor driven by an engine, and a turbine. The assembly further includes a vapor cycle system that provides cooling to additional aircraft loads where the vapor cycle system includes a second compressor, a condenser, and an evaporator. A coupling device mechanically couples the turbine in the closed loop air cycle system to the second compressor in the vapor cycle system to form an integrated rotating turbo machine. The turbine provides power to the second compressor via the coupling device using compressed air from the first compressor.

Another example of the subject disclosure includes an aircraft cooling assembly that includes a closed loop air cycle system that provides cooling to air cooled aircraft loads, the closed loop air cycle system including a first compressor driven by an engine, a first turbine, and a second turbine. A vapor cycle system provides cooling to liquid cooled aircraft loads, the vapor cycle system including a second compressor; a condenser; and an evaporator. A coupling device mechanically couples the second turbine in the closed loop air cycle system to the second compressor in the vapor cycle system where the second turbine provides power via the coupling device to the second compressor through the expansion of air across the second turbine from the first compressor. A heat expulsion system provides a heat sink to the closed loop air cycle system and the vapor cycle system.

BRIEF DESCRIPTION OF THE DRAWINGS

The accompanying drawings, which are incorporated in and constitute a part of the specification, illustrate various systems, methods, and other examples of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Figure 1:
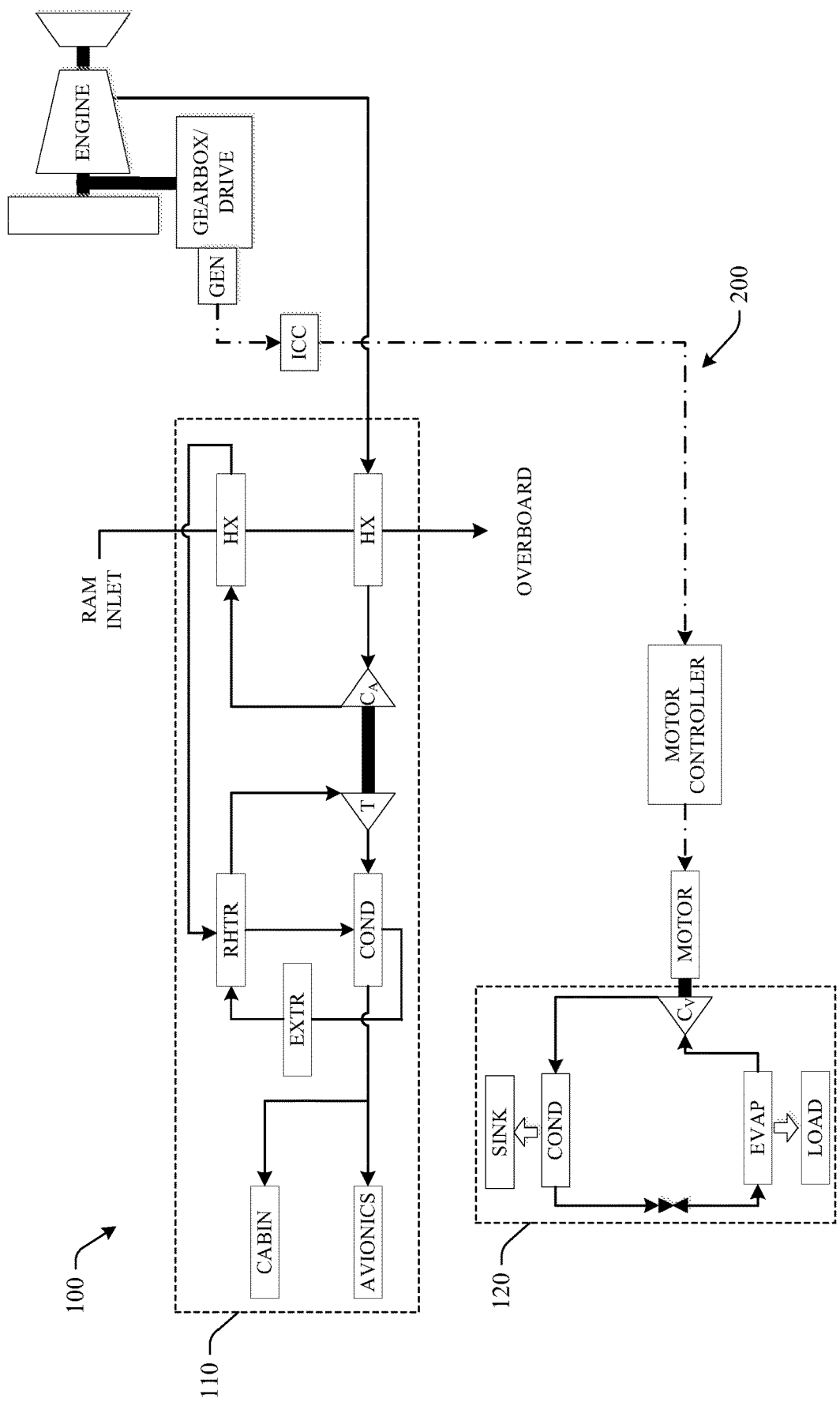
FIG. 1 schematically illustrates a federated air cycle system and vapor cycle system for an aviation vehicle.

The disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure can be practiced without these specific details. In other instances, well-known structures and devices are shown in block diagram form in order to facilitate describing the subject disclosure.

Disclosed herein is an integrated air-vapor cycle (A-VC) machine that operates as a dual function air cycle system and vapor compression cycle system that may, for example, be applied in an aviation vehicle (e.g., commercial or military aircraft). The integrated A-VC machine utilizes a turbine from the air cycle portion of the A-VC system as a power source for the vapor cycle portion of the A-VC system. More specifically, the integrated machine takes compressed air from a compressor in the air cycle system and supplies it to an expander such as the turbine that then mechanically provides the driving power for a compressor in the vapor cycle system. The mechanical driving power replaces heavy and costly electrical power conditioning devices in the aircraft's electrical power distribution system, which leads to significant weight and volumetric savings in the electrical distribution system while still enabling efficient heat load management. In addition, the integrated air-vapor cycle (A-VC) machine provides the same, if not more, level of cooling as a federated approach, while in a much more compact system that enhances the aircraft configuration.

Figure 2:
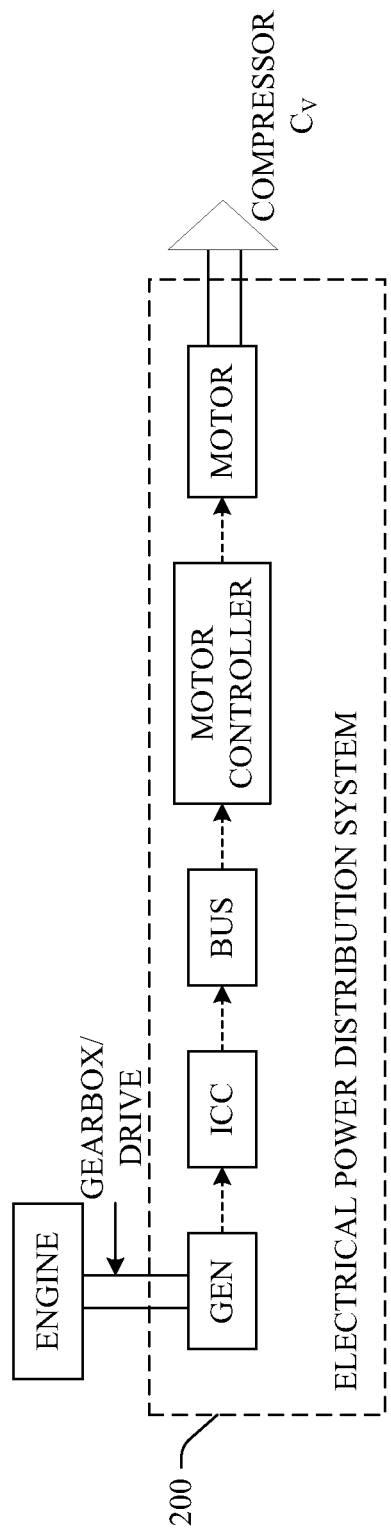
FIG. 2 schematically illustrates an electrical power distribution system required to drive a vapor cycle system for an aviation vehicle.

FIG. 1 is an illustration of a federated vapor/air cycle system 100 that includes an air cycle system 110 and an electrically driven vapor cycle system 120, and FIG. 2 is an illustration of an electrical power distribution system 200 required to drive the vapor cycle system 120 illustrated in FIG. 1. In the federated system 100 the air cycle system 110 is dedicated to air cooling loads and includes, among other components, heat exchangers HX, a compressor C, a turbine T, a high pressure water extraction system comprised of a condenser COND, a water extractor EXTR, and a re-heater RHTR. Bleed air from an aircraft engine is cooled to a nominal temperature by one or more heat exchangers HX, which are cooled by ram air via a ram inlet (or another heat sink, such as onboard aircraft fuel). The cooled air is compressed via the compressor C to a higher pressure, which adds heat to the cooled air thereby raising the temperature of the cooled air. Thus, the air goes through an additional ram air cooled heat exchanger HX before entering the re-heater RHTR and then the condenser COND. The re-heater RHTR, water extractor EXTR, and condenser COND extract water from the system to provide cold air downstream with the presence of fog. The condenser COND, however, drops the temperature of the air below the dew point. Thus, the air re-enters the re-heater RHTR to raise the temperature above the dew point to thereby, remove any moisture in the air. The air then enters the turbine T and where through an expansion process provides cold air to the condenser COND, which is then used to provide cooling to the aircraft cabin, avionics, etc.

The vapor cycle system 120 is dedicated to cooling continuous liquid loads of the aircraft and includes an electrically driven compressor $C_V$, a condenser COND and an evaporator EVAP. The condenser COND condenses coolant from the compressor $C_V$ from a gaseous state to a liquid state by transferring heat to an external sink. The cooled liquid enters the evaporator EVAP whereby the cooled liquid is used to provide cooling to a load in the aircraft and the cycle repeats.

The electrically driven compressor $C_V$ creates a significant load increase on the aircraft's electrical power system. Specifically, the electrically driven compressor $C_V$ is driven by the aircraft engine via a drive and the electrical power distribution system (EPDS) 200. The EPDS 200 includes a generator GEN, an integrated converter controller ICC, a motor controller, and a motor. These additional power loads, however, can have an adverse impact to propulsion system performance. One mechanism for handling the increased power loads in the EPDS 200 revolves around upsizing the existing generators/controllers and associated equipment. Weight, however, is a main challenge of aircraft design and a balance between energy efficiency and system weight is sought. From an electrical standpoint, the additional demand locally enlarges the power cables, the motor controller, the electro-mechanical motor, and the power conditioning units. This effect continues to ripple through the entire EPDS 200, which in turn affects electrical distribution units (EDUs), main power controllers, buses, generators, generator controllers all the way to the gear drive system of the engine. Historical data has demonstrated that every 1 kW of additional power demand on the aircraft EPDS 200 adds 4 to 5 pounds to the overall EPDS 200. Thus, a balance between energy efficiency and system weight is desired.

The integrated air-vapor cycle system (A-VC) machine overcomes the above mentioned disadvantages by removing the weight inefficiencies and cumbersome equipment required in the power conversion from the electro mechanical gearbox through the entire EPDS 200. More specifically, the integrated A-VC machine operates as a dual-function air cycle system and a vapor compression cycle system where the air cycle system turbine drives the vapor cycle system compressor. This integrated configuration eliminates the need for the ICC, the motor controller, and the motor in the aircraft's EPDS 200, thereby drastically reducing the overall complexity, weight, and power demand on the aircraft.

Figure 3:
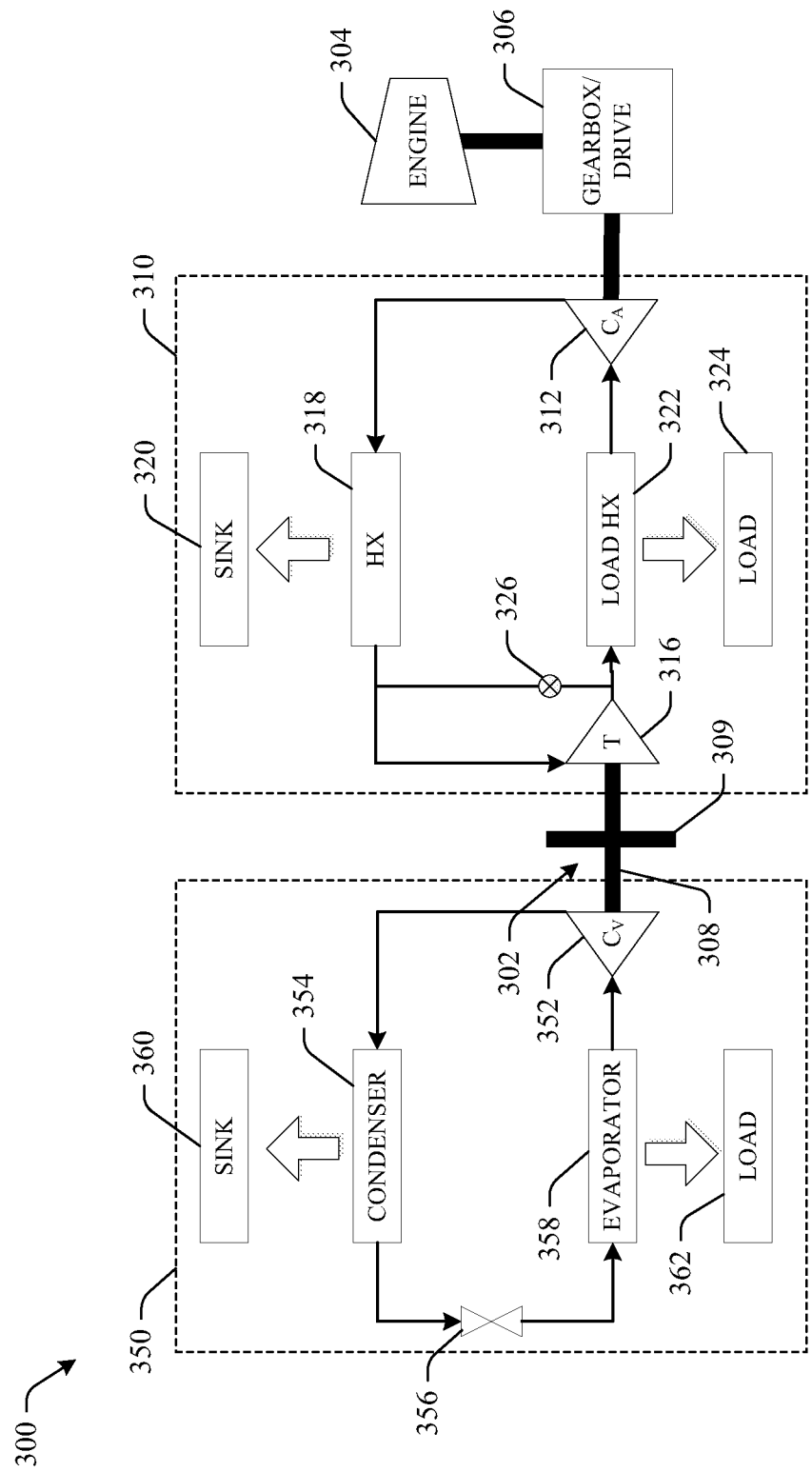
FIG. 3 schematically illustrates an example of a mechanically driven, closed-loop example of an integrated air-vapor cycle (A-VC) machine.

FIG. 3 illustrates an example mechanically driven integrated air-vapor cycle (A-VC) assembly 300 that overcomes the above disadvantages. The A-VC assembly 300 includes an A-VC machine comprised of a turbine (T) in an air cycle system coupled to a compressor ($C_V$) in a vapor cycle system via a coupling device and a coupling shaft all of which are described below. The A-VC assembly 300 includes a coupling device 302 that mechanically couples a closed loop air cycle system 310 and a vapor cycle system 350. In this example, air is compressed in an air cycle system compressor $C_A$ that is mechanically driven via an aircraft engine 304 and a gearbox/drive 306 (e.g., engine mounted or airframe mounted accessory drive (EMAD, AMAD)). The air undergoes an expansion process in a turbine T of the air cycle system 310. Specifically, the air is expanded down to an exhaust pressure in the turbine T such that the exhaust pressure produces a work output to a coupling shaft 308 of the coupling device 302. The existing compressed air from the air cycle system 310 compressor $C_A$ is utilized to supply the driving power of the turbine T drives the vapor cycle compressor $C_V$. For example, the turbine T can provide a transmission of mechanical power via a pneumatic link to the vapor cycle system compressor $C_A$. The closed loop air circuit eliminates bleed air demand from the engines, another step to achieve higher efficiency propulsion system.

The coupling shaft 308 mechanically connects (e.g., pneumatically) the turbine T to a vapor cycle system compressor $C_V$. In one embodiment, the coupling shaft 308 can be a common shaft shared by both the turbine T and the air cycle system 310 compressor $C_A$. Thus, the expansion process in the turbine T produces work output to the coupling shaft 308, which in turn drives the compressor $C_A$. In another embodiment, the turbine T and the compressor CA may each have their own shaft and the coupling device 302 may include a clutch 309 or similar mechanism that mechanically couples the turbine T shaft to the compressor $C_A$ shaft. As a result, mechanically coupling the air cycle system turbine T and the vapor cycle system compressor $C_V$ via the coupling device 302 takes the place of the costly and weighty components of the aircraft's power distribution system required to power the compressor of the vapor cycle system, as mentioned above.

Still referring to FIG. 3, the air cycle system 310 includes a first compressor (air cycle system compressor ($C_A$)) 312 and a turbine 316. Air in the first compressor 312 is compressed to a higher pressure, which adds heat to the air thereby raising the temperature of the air. The higher temperature air enters a heat exchanger 318 (e.g., liquid-to-liquid, liquid-to-air, air-to-liquid) whereby heat is expelled via a heat sink 320. The heat sink can be ram air, engine air, engine fuel etc. If engine fuel is used as the heat sink, the engine fuel can be conditioned (i.e., a temperature of the engine fuel can be varied based on heat received) to an acceptable level for delivery to the aircraft engine 304 (this applies to all the example A-VC machines disclosed herein). The cooled air enters the turbine 316 where through an expansion process provides a portion of the expanded cold air to a load heat exchanger 322, which is then used to provide cooling to an aircraft load 324. In addition, another portion of the expanded cold air the turbine 316 is used to drive a second compressor (vapor cycle system compressor ($C_V$)) 352 in the vapor cycle system 350, as described above. A turbine by-pass valve 326 is provided that controls how much expansion takes place in the turbine 316 and how much power goes toward driving the vapor cycle system compressor 352.

The vapor cycle system 350 includes the second compressor 352, a condenser 354, an expansion valve 356, and an evaporator 358. The compressor 352 is coupled to and driven by the turbine 316 of the air cycle system 310. The condenser 354 condenses coolant (refrigerant) from the compressor 352 from a gaseous state to a liquid state by transferring heat to an external sink 360. As in the air cycle system 310, the heat sink 360 can be ram air, engine air, engine fuel etc. The cooled liquid goes through an expansion process via the expansion valve 356 enters the evaporator 358 whereby the cooled liquid is used to provide cooling to a load 362 in the aircraft and the cycle repeats.

As illustrated in FIG. 3, in this example the compressor 352 is dedicated to the vapor cycle system 350 and thus, increases the vapor cycle's coolant pressure prior to the coolant entering the condenser. As mentioned above, the turbine 316 is part of an air cycle system 310 and provides the dual function of providing cold air to the load heat exchanger 322 of the air cycle system 310 and mechanically driving the compressor 352 in the vapor cycle system 350. The coupling of both the air cycle system 310 and the vapor cycle system 350 not only provides an improved overall cooling system than a conventional vapor cycle system, but also enables utilization of additional residual air when the need arises. The residual air cooling can enable cold fuel to be stored in a thermal tank to be used during periods of high demand. By creating the cold fuel storage, the overall system size can be reduced to meet nominal cooling demands instead of being sized by peak intermittent loads (e.g. directed energy weapon system loads).

In the example in FIG. 3, the air cycle system 310 and the vapor cycle system 350 of the A-VC assembly 300 pickup and reject their own heat. Specifically, the air cycle system 310 picks up heat in the load heat exchanger 322 and rejects it via the heat exchanger 318. The vapor cycle system 250 picks up heat in the evaporator 358 and dumps it via the condenser 354.

Figure 4:
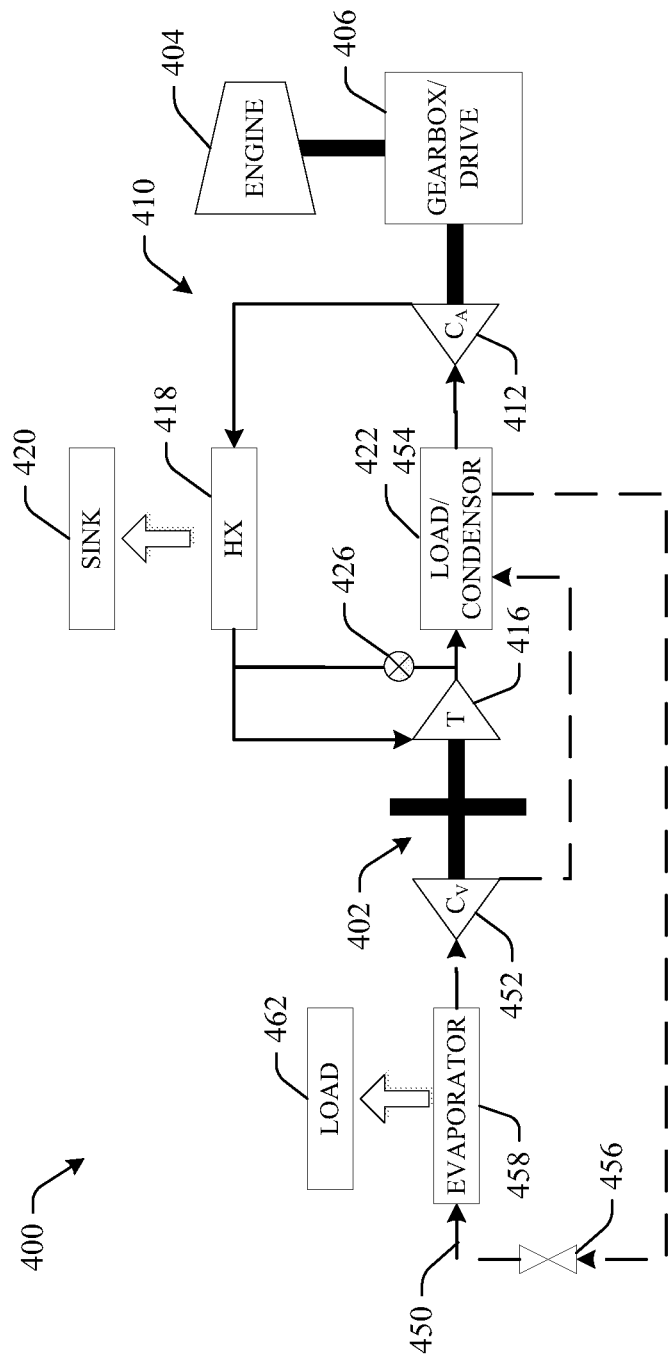
FIG. 4 schematically another example of an integrated air-vapor cycle (A-VC) machine.

FIG. 4 is another example integrated air-vapor cycle (A-VC) assembly 400 that is similar to the example integrated air-vapor cycle (A-VC) assembly 300 described above and illustrated in FIG. 3. As above, the A-VC assembly 400 includes an A-VC machine comprised of a turbine (T) in a closed loop air cycle system coupled to a compressor ($C_V$) in a vapor cycle system via a coupling device and a coupling shaft all of which are described below. The A-VC assembly 400 includes a coupling device 402 similar to the embodiments described above that couples an air cycle system 410 and a vapor cycle system 450 thus, forming the integrated A-VC assembly 400. An air cycle system compressor $C_A$ is mechanically driven via an aircraft engine 404 and a gearbox/drive 406. The A-VC assembly 400, however, allows moderate condensing temperature refrigerants operating with the heat sink exceeding a critical region.

The A-VC assembly 400 includes an air cycle system 410 and a vapor cycle system 450. As above, the air cycle system 410 includes a first compressor ($C_A$) 412 and a turbine 416. Air in the compressor 412 is compressed to a higher pressure, which adds heat to the air thereby raising the temperature of the air. The higher temperature air enters a heat exchanger 418 whereby heat is expelled via a heat sink 420. The cooled air enters the turbine 416 where through an expansion process provides a portion of the expanded cold air to a load/condenser 422, 454. In addition, another portion of the expanded cold air in the turbine 416 is used to drive a second compressor ($C_V$) 452 in the vapor cycle system 450. A turbine by-pass valve 426 is provided that controls how much expansion takes place in the turbine 416 and how much power goes toward driving the vapor cycle system compressor 452.

The vapor cycle system 450 includes the second compressor 452, the condenser 454, an expansion valve 456, and an evaporator 458. The compressor 452 is coupled to and driven by the turbine 416 of the air cycle system 410. For example, the turbine 416 can provide a transmission of mechanical power via a pneumatic link to the vapor cycle system compressor 452. The vapor cycle system 450 in this example, however, uses the load heat exchanger 322 in the air cycle system 310 illustrated in FIG. 3 as the condenser 454. Thus, the vapor cycle system 450 expels its heat into the air cycle system 410 where it enters the compressor 412 and is compressed in the closed loop air cycle system 410 thus, further increasing the temperature of the air. This air then rejects the heat to a high temperature sink, such as engine air or hot temperature fuel, which the vapor cycle system 450 could not normally use. Once the heat is expelled to the air cycle system 410, thereby condensing the coolant from a gaseous state to a liquid state the cooled liquid goes through an expansion process via the expansion valve 456 and enters the evaporator 458 whereby the cooled liquid is used to provide cooling to a load 462 in the aircraft and the cycle repeats.

The example illustrated in FIG. 4 is an integrated system where expansion across the turbine 416 provides driving power for the vapor cycle system compressor 452. In this example, the expansion of air across the turbine 416 also creates the sink (or cold air) for the vapor cycle system 450. In this example, the load taken up by the evaporator 458 is transferred from the vapor cycle system 450 to the air cycle system 410 via the condenser 454 and then rejected to the sink via the heat exchanger 418.

Figure 5:
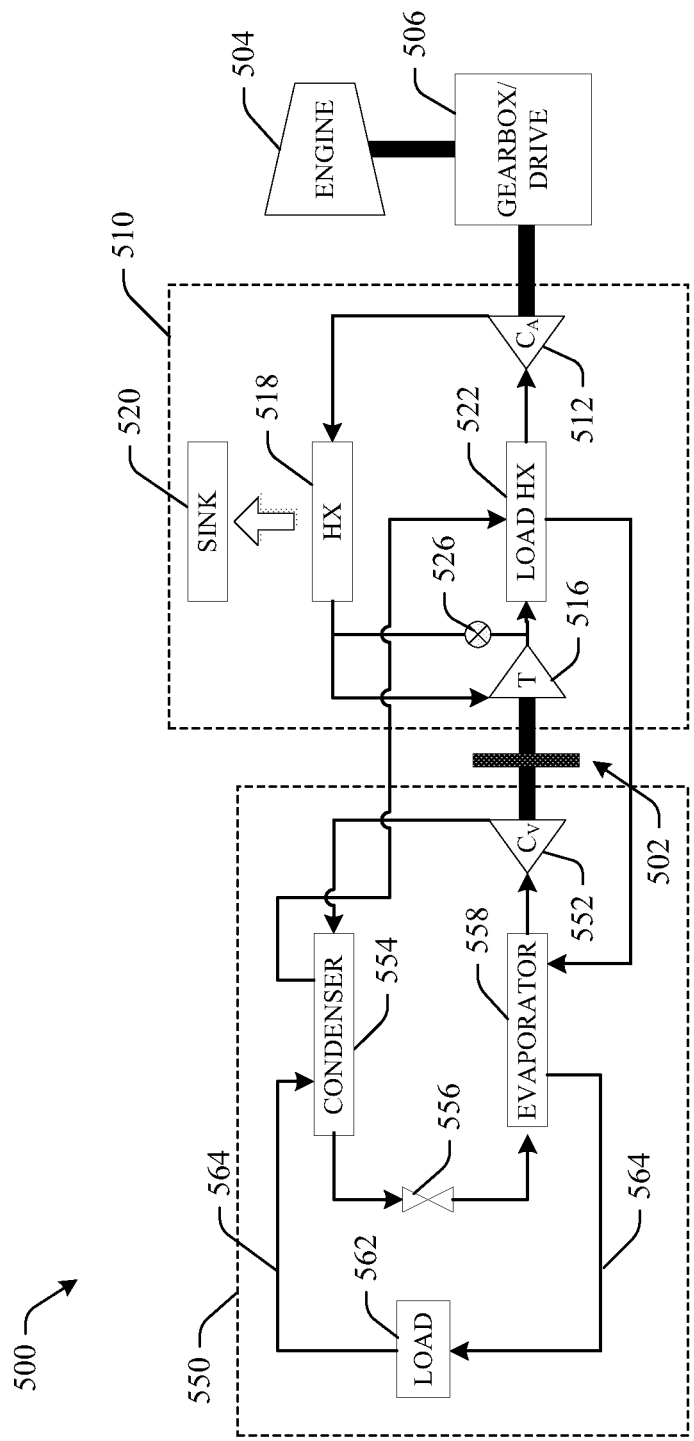
FIG. 5 schematically another example of an integrated air-vapor cycle (A-VC) machine.

FIG. 5 is another example integrated air-vapor cycle (A-VC) assembly 500 that is similar to the example integrated air-vapor cycle (A-VC) assembly 300 described above and illustrated in FIG. 3. As above, the A-VC assembly 500 includes an A-VC machine comprised of a turbine (T) in a closed loop air cycle system coupled to a compressor ($C_V$) in a vapor cycle system via a coupling device and a coupling shaft all of which are described below. The A-VC assembly 500 includes a coupling device 502 similar to the embodiments described above that couples an air cycle system 510 and a vapor cycle system 550 thus, forming the integrated A-VC assembly 500. An air cycle system compressor $C_A$ is mechanically driven via an aircraft engine 504 and a gearbox/drive 506. In this example, implementation of the aircraft's avionics as a load and associated liquid avionics cooling (transportation) loops allows lower condensing temperatures in the condenser of vapor cycle system 550 thus, resulting in significant Coefficient of Performance (COP) gains.

In this example, the air cycle system 510 includes a first compressor ($C_A$) 512 and a turbine 516. Air in the compressor 512 is compressed to a higher pressure, which adds heat to the air thereby raising the temperature of the air. The higher temperature air enters a heat exchanger 518 whereby heat is expelled via a heat sink 520. As in the examples above, the heat sink can be ram air, engine air, engine fuel etc. If engine fuel is used as the heat sink, the engine fuel can then be conditioned (i.e. a temperature of the engine can be varied) for acceptable levels for delivery to the aircraft engine 504. The cooled air enters the turbine 516 where through an expansion process provides a portion of the expanded cold air to a load heat exchanger 522, which is turn acts a heat sink for the air cycle system 510 described below.

In addition, another portion of the expanded air in the turbine 516 is used to drive a second compressor ($C_V$) 552 in the vapor cycle system 550. A turbine by-pass valve 526 is provided that controls how much expansion takes place in the turbine 516 and how much power goes toward driving the vapor cycle system compressor 552.

The vapor cycle system 550 includes the second compressor 552, a condenser 554, an expansion valve 556, and an evaporator 558. The compressor 552 is coupled to and mechanically driven by the turbine 516 of the air cycle system 510. For example, the turbine 516 can provide a transmission of mechanical power via a pneumatic link to the vapor cycle system compressor 552. The condenser 554 condenses coolant (refrigerant) from the compressor 552 from a gaseous state to a liquid state by using the load heat exchanger 522 in the air cycle system 510 as a heat sink. The cooled coolant goes through an expansion process via the expansion valve 556 and enters the evaporator 558 whereby the cooled coolant is used to provide cooling to a load 562 in the aircraft.

As mentioned above, the load 562 in this example includes the aircraft's liquid cooled avionics. Thus, the coolant travels in a cooling loop 564 to provide cooling to the avionic heat load 562. Once cooled, the liquid continues along avionic cooling loops 564 and is used as the condensing liquid (coolant) in the condenser 554. This is advantageous because the temperature requirement for cooling avionics is lower than other aircraft loads. For example, the temperature requirement for liquid cooled avionics may have a coolant inlet temperature of approximately 59° F. and a coolant outlet temperature of approximately 90° F. depending on the type of avionic load. Thus, the exiting temperature of the coolant leaving the avionic load 562 is approximately 90° F. As a result, the condensing temperature of the coolant entering the condenser 554 is approximately 90° F., which is significantly cooler (e.g., approximately 60-70° F. cooler) than a conventional condensing temperature. As a result, the vapor cycle system 450 COP can be improved approximately three-fold, as illustrated in FIG. 6 subsequently described, which results in lowering the system's condensing temperature.

Figure 6:
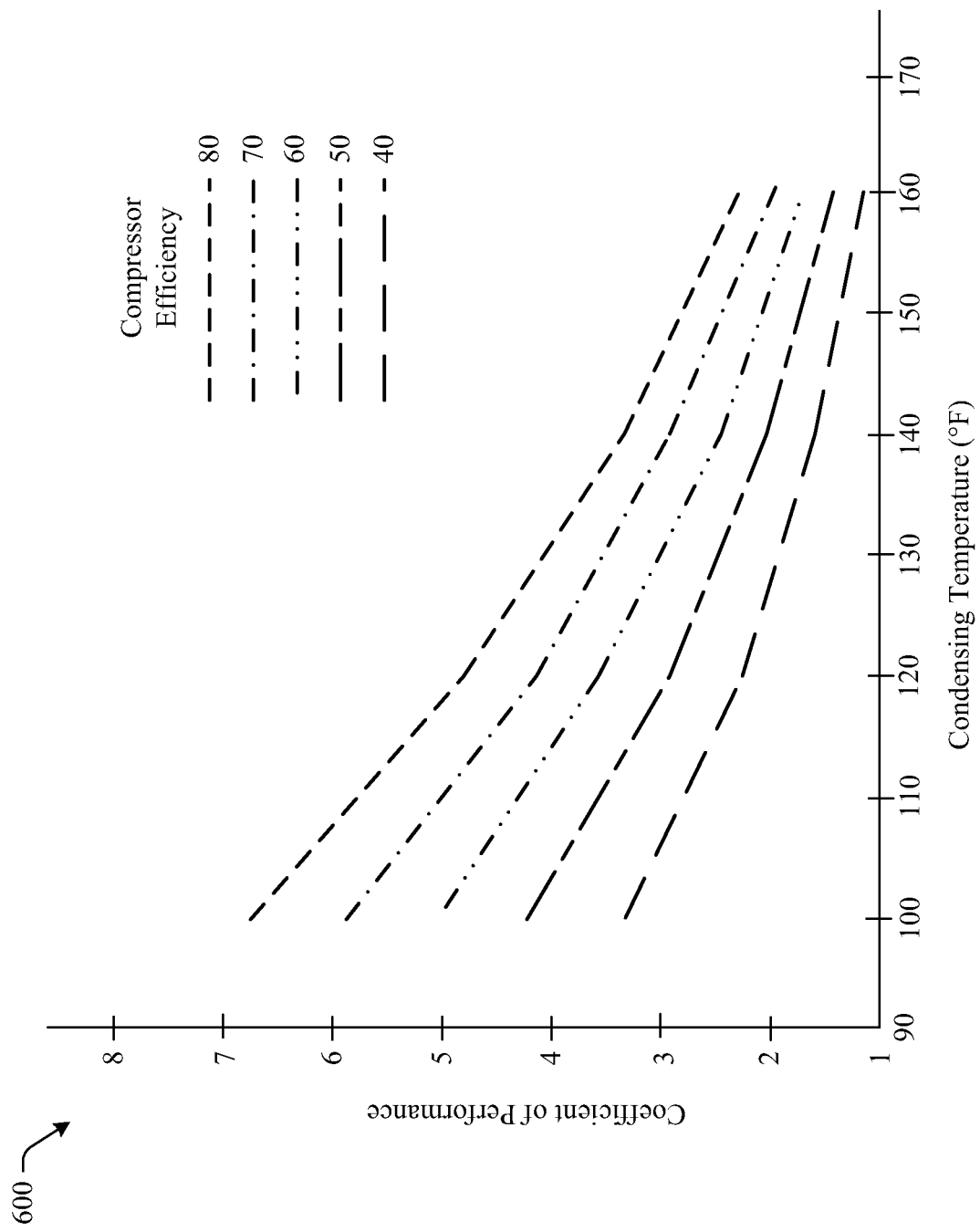
FIG. 6 is a graphical representation of Coefficient of Performance improvements for an air-vapor cycle (A-VC) machine.

FIG. 6 is a graph 600 illustrating COP improvements for condensing temperatures ranging from 100° F. to 160° F. for compressor efficiencies of 40%, 50%, 60%, 70%, and 80%. As mentioned above, using the aircraft's avionics as a load lowers the condensing temperature in the condenser 554. In one example, for an approximate compressor efficiency of 80%, the vapor cycle system 450 COP can be improved from approximately 2 for a federated system where the condensing temperature is approximately 160° F. to approximately 7 thus, improving the vapor cycle system 450 COP by approximately 350%.

Figure 7A:
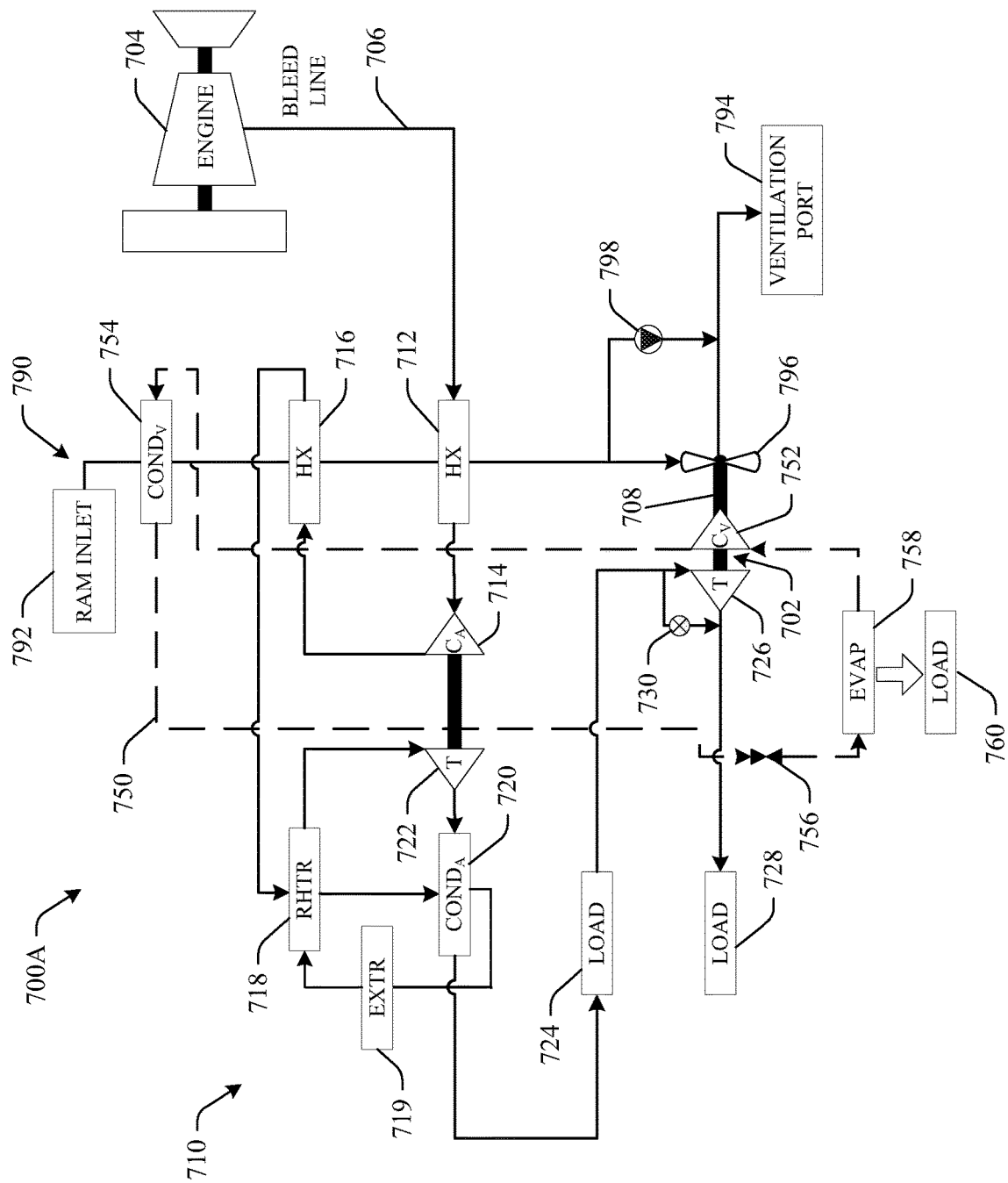
FIGS. 7A and 7B schematically illustrate other examples of a pneumatically driven, open loop example of an integrated A-VC machine.
Figure 7B:
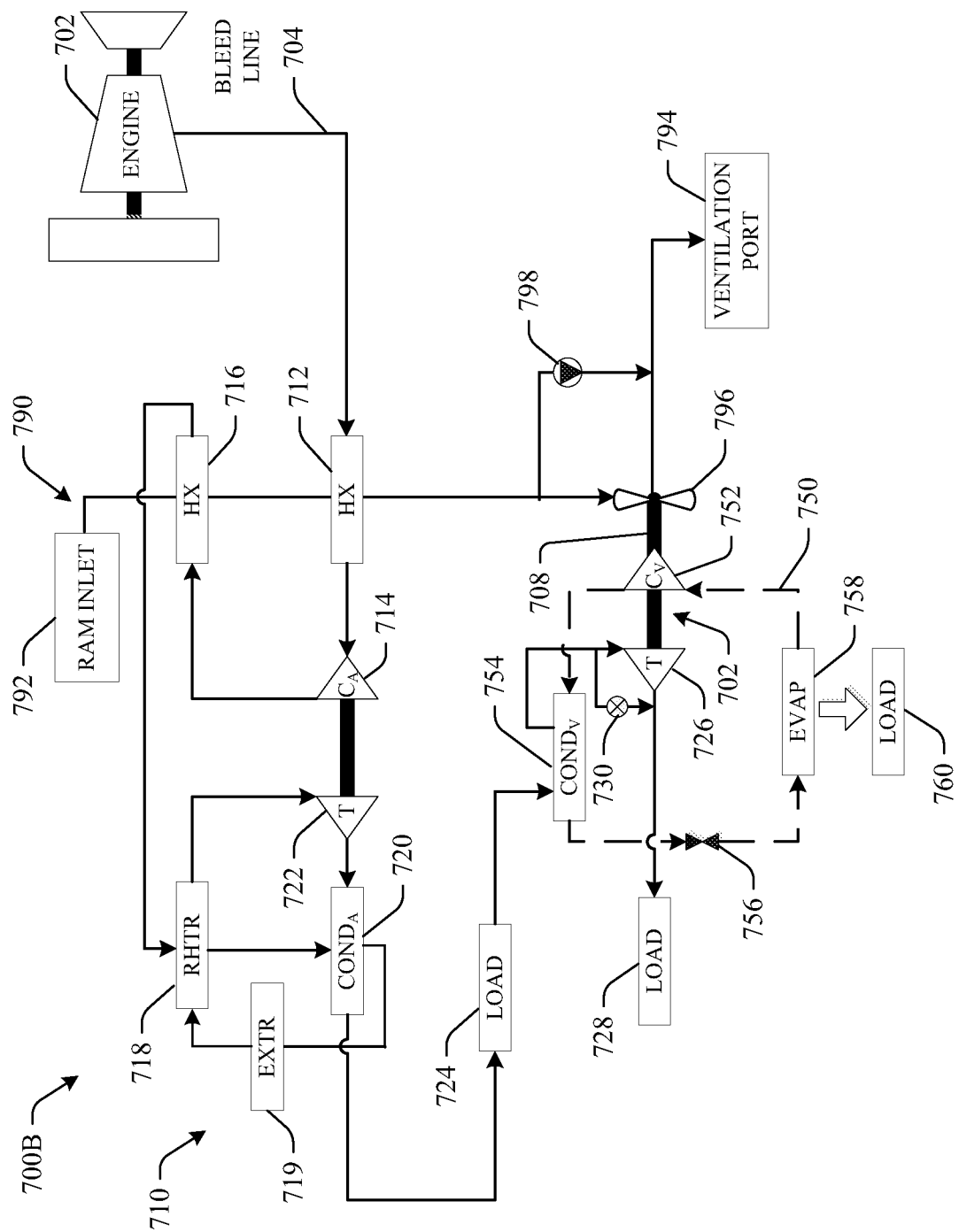

FIGS. 7A and 7B illustrate other examples of an integrated A-VC assembly 700A, 700B that includes a coupling device 702 having a shaft 708 similar to the embodiments described above that mechanically couples an air cycle system 710 to a vapor cycle system (represented by the broken line) 750. The A-VC assemblies 700A, 700B further include a heat expulsion system such as a ram air system 790, aircraft engine air, aircraft onboard fuel, etc. The ram air system 790 includes an integral fan where integral fan provides ventilation when the aircraft is not in flight.

Referring first to FIG. 7A, hot air is bled from an aircraft engine 704 to the air cycle system 710 via a bleed line 706. The hot air enters a first heat exchanger 712 upstream from a first compressor (air cycle compressor ($C_A$)) 714, where the first heat exchanger 712 cools the hot air from the engine 704 to a nominal temperature. The cooled air then enters the first compressor 714 where the compressor 714 compresses the cooled air to a higher pressure, which consequently raises the temperature of the cooled air. The heat due to the compression is removed via a second heat exchanger 716 that is located downstream of the compressor 714. In one embodiment, both the first 712 and second 716 heat exchangers may utilize ram air as via a ram inlet as a heat sink to remove heat from the air circulating through the air cycle system 710. In other embodiments, the heat may be removed from the first 712 and second 716 heat exchangers via another heat sink such as engine fuel, engine air, etc.

The air then enters a high pressure water extraction system that includes a re-heater (RHTR) 718, a water extractor (EXTR) 719, and a first condenser ($COND_A$) 720. The extraction system extracts water from the air so that cold air is provided downstream without the inclusion of fog in the air. During the extraction process, however, the first condenser 720 lowers the temperature of the air below the dew point. Thus, the air reenters the re-heater 718 where the re-heater 718 raises the temperature of the air above the dew point so no moisture propagates downstream.

The air then enters a first turbine 722, which drives the first compressor 714, and through an expansion process delivers cold air to the first condenser 720. The cold air is provided to one or more loads (air cooled, first) 724, such as avionics, an aircraft cabin, etc. The load 724 adds heat to the air upon which the air enters a second turbine 726 and through a second expansion process delivers cold air to one or more additional air cooled loads 728. In addition, the second turbine 726 is the power source for a second compressor (vapor cycle compressor ($C_V$)) 752 in the vapor cycle system 750. Specifically, the air is expanded in the second turbine 726, which in turn drives a vapor cycle system compressor $C_V$ via the coupling device 702. The two systems can be linked via the coupling device 702 using the existing air pressure in the air cycle system 710. For example, the second turbine 726 can provide a transmission of mechanical power via a pneumatic link to the second compressor 752. As a result, linking the air cycle system turbine and the vapor cycle system compressor $C_V$ via the coupling device 702 takes the place of the costly and weighty components of the aircraft's power distribution system required to power the compressor of the vapor cycle system, as mentioned above. The second turbine 726 can be bypassed via a bypass valve 730 as needed to maintain a constant speed in the second compressor 752 for reliable performance in the vapor cycle system 750.

In addition to the second compressor 752, the vapor cycle system 750 includes a second condenser ($COND_V$) 754, an expansion valve 756, and an evaporator 758. As previously mentioned the compressor 752 is coupled to and driven by the second turbine 726. The condenser 754 condenses coolant (refrigerant) from the second compressor 752 from a gaseous state to a liquid state by transferring heat to the ram air that enters via the ram inlet. The cooled liquid goes through an expansion process via an expansion valve 756 and enters the evaporator 758 whereby the cooled liquid is evaporated into a gas and is used to provide cooling to one or more liquid cooled loads (e.g., sensors, liquid transport loop, etc.) 760 in the aircraft and the cycle repeats.

The ram air system 790 brings cold outside air into the aircraft via a ram inlet 792. The cold air acts as a heat sink and passes through the condenser 754 in the vapor cycle system 750 and the two heat exchangers 712, 716 in the air cycle system 710 as described above. During the flight of the aircraft the ram air provides ventilation to the aircraft via a ventilation port 794. When the aircraft is not in flight (non-operative periods), a fan 796, which is detachably coupled to and driven by the second turbine 726 via the shaft 708 of the coupling device 702, provides ventilation to the aircraft. Thus, the turbine 726 drives both the second compressor 752 and the fan 796 via the coupling shaft 708 of the coupling device 702. A check valve 798 is provided to bypass the fan 796 when the aircraft is in flight. In addition, the fan 796 can also be used to provide a load balance between the air cycle system 710 and the vapor cycle system 750. Thus, if needed the fan 796 can be driven by the second turbine 726 or can be bypassed via the check valve 798 to adjust the load balance between the air cycle system 710 and the vapor cycle system 750.

This example configuration provides several advantages. Placing the condenser 754 of the vapor cycle system 750 in the ram air stream credits power from the fan 796 back to the air cycle system 710 when the aircraft is in flight. In addition, placing the heat sink (ram air) for the condenser 754 of the vapor cycle system 750 upstream from the first turbine 722 recovers the heat to power the compressor 752 of the vapor cycle system 750, which further bolsters energy recovery. In addition, air leaving the first 722 turbine is now used as necessary to cool additional loads, whereas in prior systems the heat was exhausted overboard. Still further, implementation of the fan 796 provides additional aircraft benefits by eliminating the need for electrical fans or bleed consumption heavy ejectors in order to induce ram air flow for ground operations. If, however, the heat sink for the condenser 754 is other than ram air (e.g., engine air), then the fan 796 can still be utilized for other applications such as bay ventilation.

FIG. 7B is an illustration of an example integrated A-VC assembly 700B that is similar to the A-VC assembly 700A explained above and illustrated in FIG. 7A except for the location of the second condenser 754. Instead of being placed in the ram air stream, the second condenser 754 is placed after the first load 724 on the upstream side of the second turbine 726. Thus, instead of using ram air as the heat sink for the vapor cycle system 750, the cold air from the first load 724 on the air cycle system 710 side is used as the heat sink. Thus, prior to the air from the first load 724 entering the second turbine 726, additional heat is expelled from the air via the condenser 754 as compared to the example A-VC machine 700A illustrated in FIG. 7A. The air then enters the second turbine 726 where the cold air is used to cool additional loads and provide power to the compressor 752 of the vapor cycle system 750.

The A-VC assembly examples with the turbine powered vapor cycle system compressor disclosed herein have unique and advantageous benefits such as residual cooling capability, which enables thermal storage for periods of high demand while still supplying mission system load management. In addition, the A-VC assembly can create a chilled fuel thermal tank, which can be tailored to a specific mission. Implementation of the fan provides additional aircraft level benefit by eliminating the need for electrical fans or bleed consumption heavy ejectors in order to induce ram air flow for ground operations. The configuration of the integrated A-VC assembly facilitates an efficient installation.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An aircraft cooling assembly, comprising:
a closed loop air cycle system that provides cooling to at least one first aircraft load, the closed loop air cycle system including a first compressor driven by an engine, and a turbine;
a vapor cycle system that provides cooling to at least one second aircraft load, the vapor cycle system including a second compressor; a condenser; and an evaporator; and
a coupling device that mechanically couples the turbine in the closed loop air cycle system to the second compressor in the vapor cycle system,
wherein the turbine provides power to the second compressor via the coupling device using compressed air from the first compressor.

2. The assembly of claim 1, wherein the closed loop air cycle system further includes at least one heat exchanger and at least one heat sink and wherein the heat exchanger receives air having an elevated temperature from the first compressor and that expels heat from the air to the at least one heat sink thereby lowering the temperature of the air.

3. The assembly of claim 2, wherein the air from the heat exchanger enters the turbine and is expanded to an exhaust pressure in the turbine where a portion of the air after expansion pneumatically couples the turbine to the second compressor via a coupling shaft of the coupling device to drive the second compressor.

4. The assembly of claim 3, wherein the closed loop air cycle system includes at least one load heat exchanger that receives another portion of the air from the turbine to provide cooling to the at least one first aircraft load.

5. The assembly of claim 4, wherein the vapor cycle system further includes a condenser that condenses a coolant from the compressor by transferring heat from the coolant to a heat sink, and an evaporator that receives the air from the condenser that provides cooling to the at least one second aircraft loads.

6. The assembly of claim 4, wherein the vapor cycle system further includes a condenser and an evaporator that receives the air from the condenser to provide cooling to the at least one second aircraft loads, wherein the vapor cycle system uses the load heat exchanger in the closed loop air cycle system as the condenser and wherein the condenser expels heat from the coolant into the closed loop air cycle system.

7. The assembly of claim 6, wherein the at least one heat sink is a high temperature heat sink including one of engine fuel or engine air.

8. The assembly of claim 6, wherein the heat sink is engine fuel and a temperature of the engine fuel is varied based on heat received to an acceptable level for delivery to the engine.

9. The assembly of claim 4, wherein the vapor cycle system further includes a condenser that condenses a coolant from the compressor by transferring heat from the coolant to a heat sink where the heat sink is the load heat exchanger in the closed loop air cycle system, and an evaporator that receives the air from the condenser that provides cooling to the at least one second aircraft loads.

10. The assembly of claim 9, wherein the at least one second aircraft load includes an aircraft avionic load and wherein the coolant travels from the evaporator to the avionic aircraft load and from the avionic aircraft load to the condenser.

11. The assembly of claim 10, wherein the coolant exiting the avionic aircraft load is a condensing coolant for the condenser and has an exit temperature significantly lower than a condensing temperature of a condensing coolant from other aircraft loads.

12. An aircraft cooling assembly, comprising:
a closed loop air cycle system that provides cooling to air cooled aircraft loads, the closed loop air cycle system including a first compressor driven by an engine, a first turbine, and a second turbine;
a vapor cycle system that provides cooling to liquid cooled aircraft loads, the vapor cycle system including a second compressor; a condenser; and an evaporator;
a coupling device that mechanically couples the second turbine in the closed loop air cycle system to the second compressor in the vapor cycle system where the second turbine provides power via the coupling device to the second compressor through the expansion of air across the second turbine from the first compressor; and
a heat expulsion system that provides a heat sink to the closed loop air cycle system and the vapor cycle system.

13. The assembly of claim 12, wherein the coupling device includes a coupling shaft that connects the second turbine to the second compressor and wherein the air is expanded down to an exhaust pressure in the second turbine such that the exhaust pressure pneumatically couples the second turbine to the second compressor via the coupling shaft of the coupling device to drive the second compressor.

14. The assembly of claim 12, wherein the closed loop air cycle system further includes a first heat exchanger upstream from the first compressor and a second heat exchanger downstream from the first compressor and wherein the first heat exchanger and the second heat exchanger expel heat to a heat sink.

15. The assembly of claim 14, further comprising a high pressure water extraction system that extracts moisture from the air for further downstream processing, wherein the air from the high pressure water extraction system enters the first turbine and undergoes an expansion process in the first turbine and wherein a portion of the air due to the expansion process from the first turbine is provided to drive the first compressor and another portion of the air due to the expansion process from the turbine provides cooling to the air cooled aircraft loads.

16. The assembly of claim 15, wherein the air cooled aircraft loads add heat to the air, wherein the heated air enters the second turbine and undergoes a second expansion process, and wherein a portion of the heated air due to the expansion process from the second turbine is provided to drive the second compressor and another portion of the heated air due to the expansion process from the second turbine provides cooling to additional air cooled aircraft loads.

17. The assembly of claim 16, wherein the vapor cycle system further includes a condenser that condenses a coolant from the second compressor by transferring heat from the coolant to the heat sink, and an evaporator that receives the air from the condenser that provides cooling to the liquid cooled aircraft loads.

18. The assembly of claim 17, wherein the vapor cycle system further includes a condenser that condenses a coolant from the second compressor by transferring heat from the coolant to cold air from the air cooled aircraft loads, and an evaporator that receives the air from the condenser that provides cooling to the liquid cooled aircraft loads.

19. The assembly of claim 12, wherein the heat expulsion system includes at least one of a ram air system, engine air, and onboard aircraft fuel.

20. The assembly of claim 19, wherein the ram air system includes a fan coupled to the second turbine via the coupling device and wherein the fan provides cooling during non-operative periods of the ram air system.

* * * * *